May 11, 1965 H. GRAMESPACHER ETAL 3,182,533
WORKPIECE LOADING AND DISCHARGING DEVICE
FOR MACHINE TOOLS
Filed July 30, 1962 9 Sheets-Sheet 1

INVENTORS:
Herbert Gramespacher
Paul Frischknecht
BY

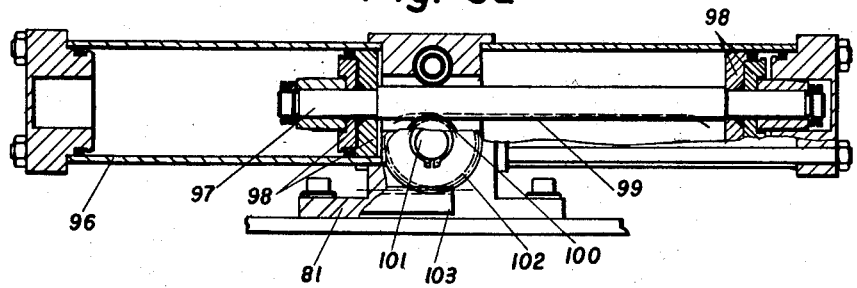
Fig. 9a
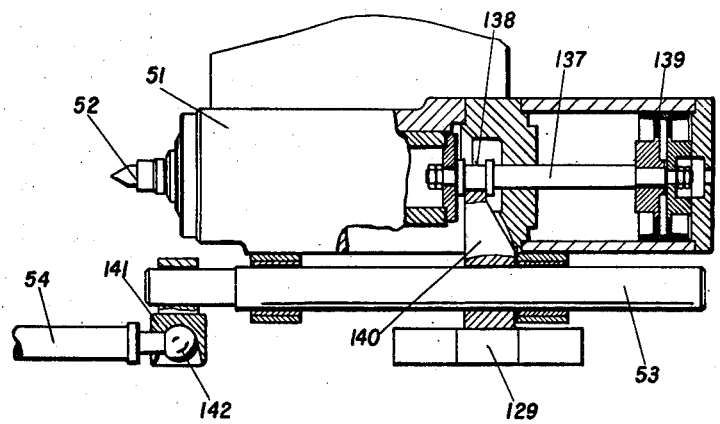
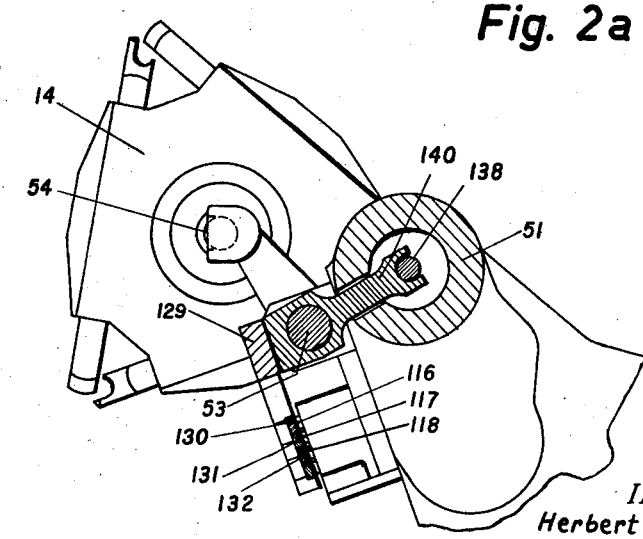
Fig. 2a
Fig. 2b
INVENTORS:
Herbert Gramespacher
Paul Frischknecht
BY INVENTORS:
Herbert Gramespacher
Paul Frischknecht
BY INVENTORS:
Herbert Gramespacher
Paul Frischknecht
BY

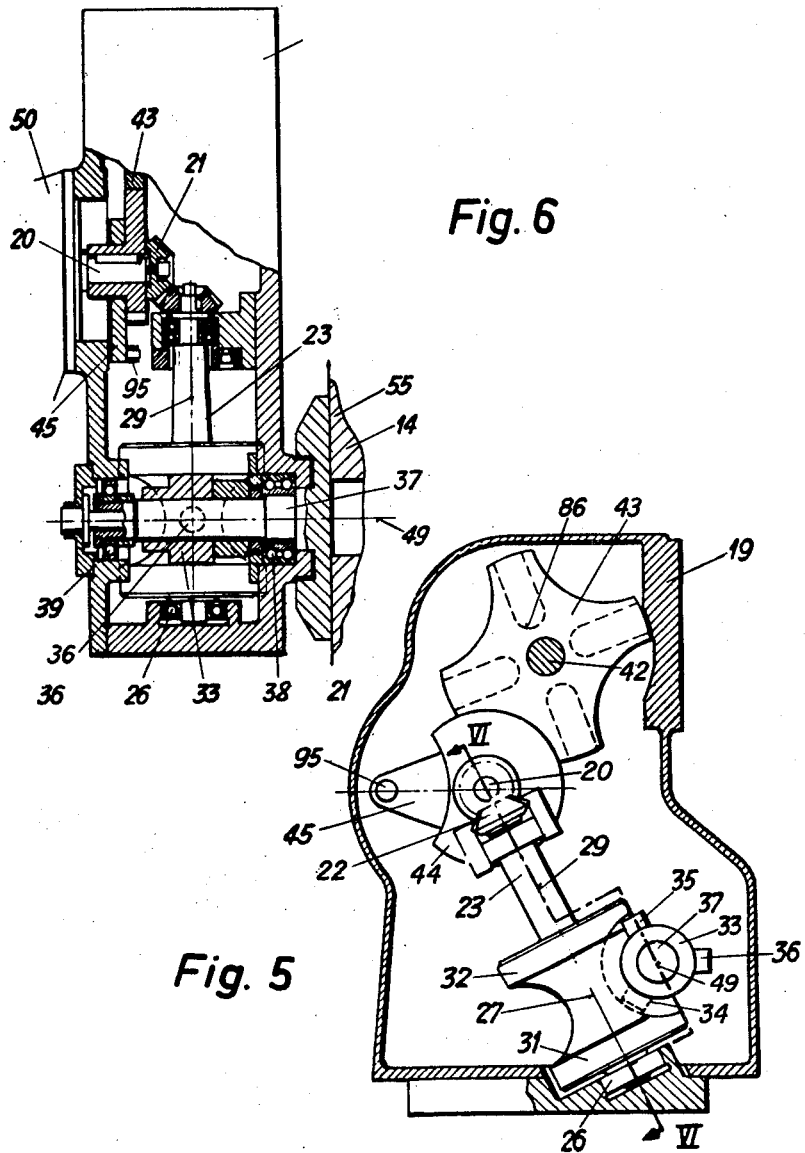

INVENTORS:
Herbert Gramespacher
Paul Frischknecht

INVENTORS:
Herbert Gramespacher
Paul Frischknecht

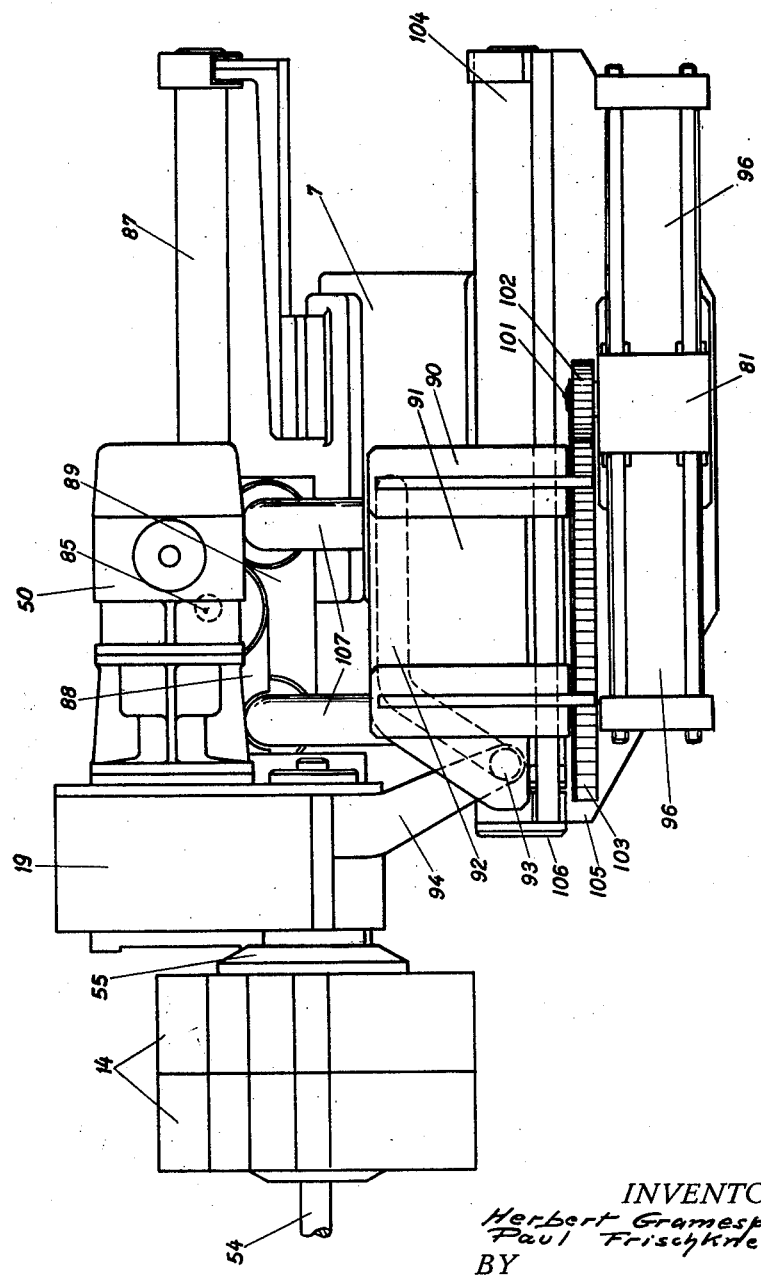

United States Patent Office 3,182,533
Patented May 11, 1965

3,182,533
WORKPIECE LOADING AND DISCHARGING
DEVICE FOR MACHINE TOOLS
Herbert Gramespacher and Paul Frischknecht, Schaffhausen, Switzerland, assignors to Georg Fischer Aktiengesellschaft, Schaffhausen, Switzerland
Filed July 30, 1962, Ser. No. 213,403
Claims priority, application Switzerland, Aug. 3, 1961,
9,085/61
8 Claims. (Cl. 82—2.7)

The present invention relates to a workpiece charging and discharging apparatus for a machine tool, especially a lathe, by means of which workpieces in a position in which their axes are parallel to the machining axis are fed from a magazine through a distributing device by means of a charging drum into machining position and, following the completion of the machining operation, are moved into a discharging position.

The automation of various machining operations requires devices which move the workpieces over the shortest path into a predetermined position for carrying out a certain machining operation, while said devices, following the completion of the machining operation will then move the workpiece into a discharge position.

It is an object of the present invention to provide a device or apparatus of the above mentioned type which will automatically carry out the above mentioned charging and discharging operations in a smooth and shock-free manner.

It is also an object of this invention to provide an apparatus as set forth in the preceding paragraph, which will be safe and reliable and work with a minimum of wear.

These and other objects and advantages of the invention will appear more clearly from the following specification in connection with the accompanying drawings, in which:

FIG. 2a shows means for moving the tail spindle in the tail stock toward the head stock, FIG. 2a being a section along the line IIa—IIa of FIG. 1.

FIG. 2b is a partial section along the line IIb—IIb of FIG. 1.

FIG. 5 is a partial section taken along the line V—V of FIG. 4.

FIG. 6 is a partial section taken along the line VI—VI of FIG. 5.

FIG. 9a is a section along the line IXa—IXa of FIG. 9.

FIG. 9b is a top plan view of FIGURE 9.

Figure 11:
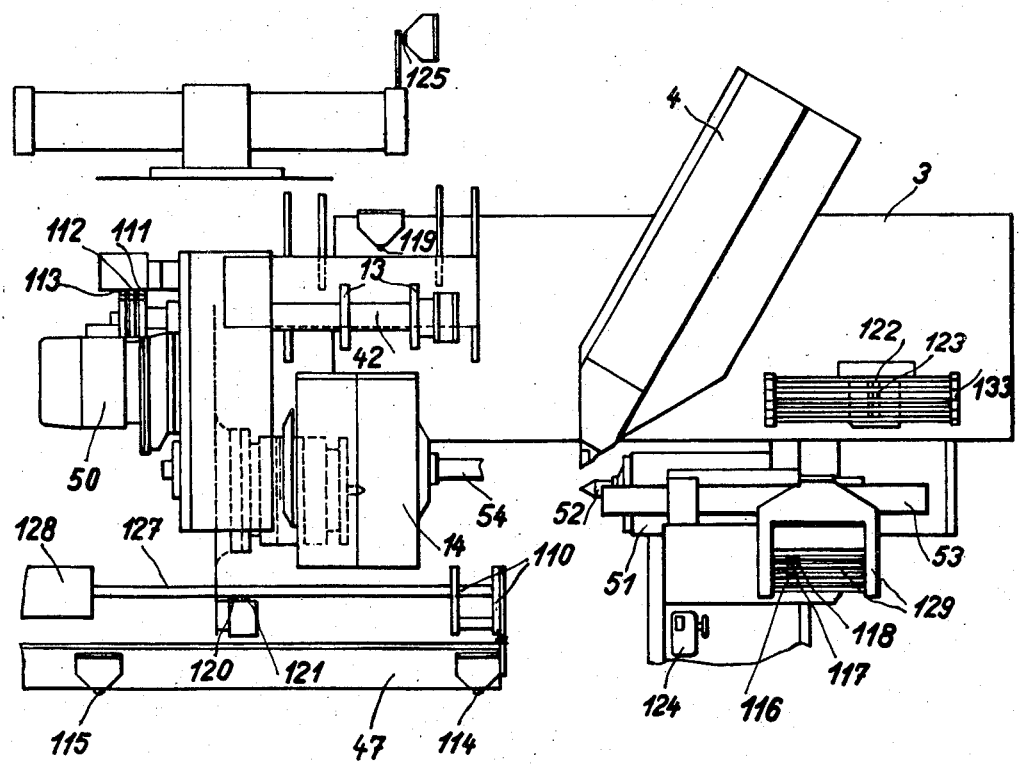

FIG. 11 diagrammatically illustrates the location of the various control members in the machine and in the loading device.

The arrangement according to the present invention is characterized primarily in that a change-over gear system driven at practically constant speed is provided with driving means for actuating in common a feeding device and a charging drum, and is furthermore characterized in that the charging drum is provided with a plurality of simultaneously operable pairs of gripper arms for the workpiece, said pairs of gripper arms being uniformly distributed over the circumference of the charging drum and in working position protruding from the circumference of the drum. Said pairs of gripper arms are operable by a centrally located control piston.

Figures 1, 2:
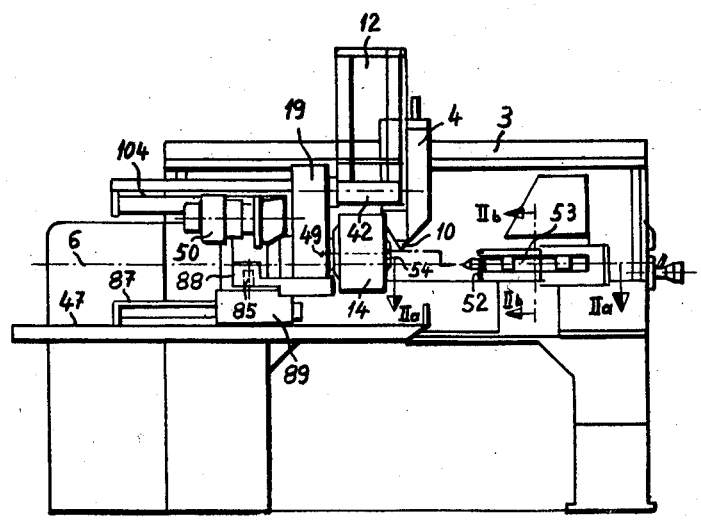
FIG. 1 is a front view of a lathe with a workpiece charging and discharging apparatus in conformity with the present invention.
FIG. 2 is a top view of the lathe according to FIG. 1.
Figure 3:
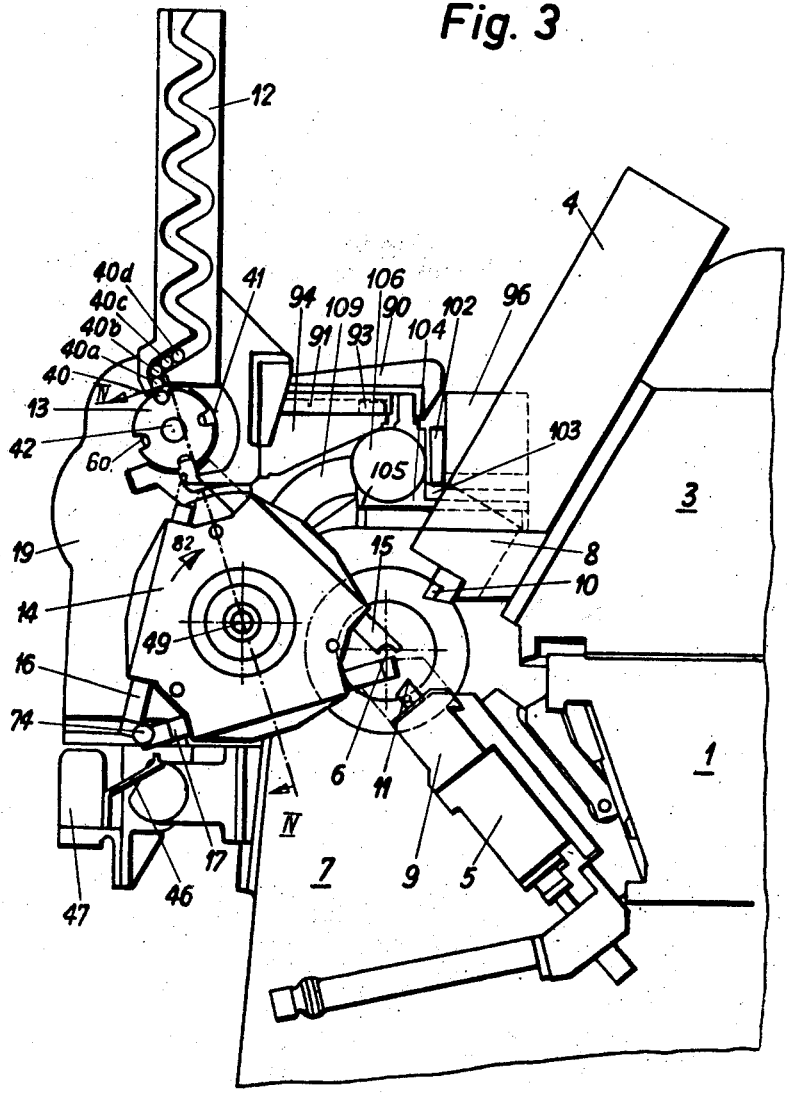
FIG. 3 is a partial section perpendicular to the axis of rotation of the lathe according to FIGS. 1 and 2.

More specifically, referring to the drawings, the lathe illustrated in front view in FIG. 1, in top view in FIG. 2 and as a partial section in FIG. 3 comprises a lathe bed 1 supported by a head stock 7 and a stand 2, said head stock 7 and stand 2 may have a box shape. On and along said lathe bed 1 is displaceably mounted a base carriage 3 which is equipped with two tool carriages 4 and 5. These tool carriages are displaceably guided transverse to the axis of rotation 6 of the lathe by means of guiding means (not shown) in the base carriage 3. The said two tool carriages 4 and 5 serve for receiving tool holders 8 and 9 with turning tools 10 and 11.

The lathe, which could for instance be a post shaping lathe, is provided with an automatic workpiece loading and discharging device. Arranged on a transmission housing 19 is a magazine 12 of a suitable design which may be of any standard type, which magazine contains workpieces to be machined, namely the work pieces 40, 40a, 40b, 40c and 40d, which are fed into the magazine by conveying means of any standard type located above the magazine but not shown in the drawing.

Figure 4:
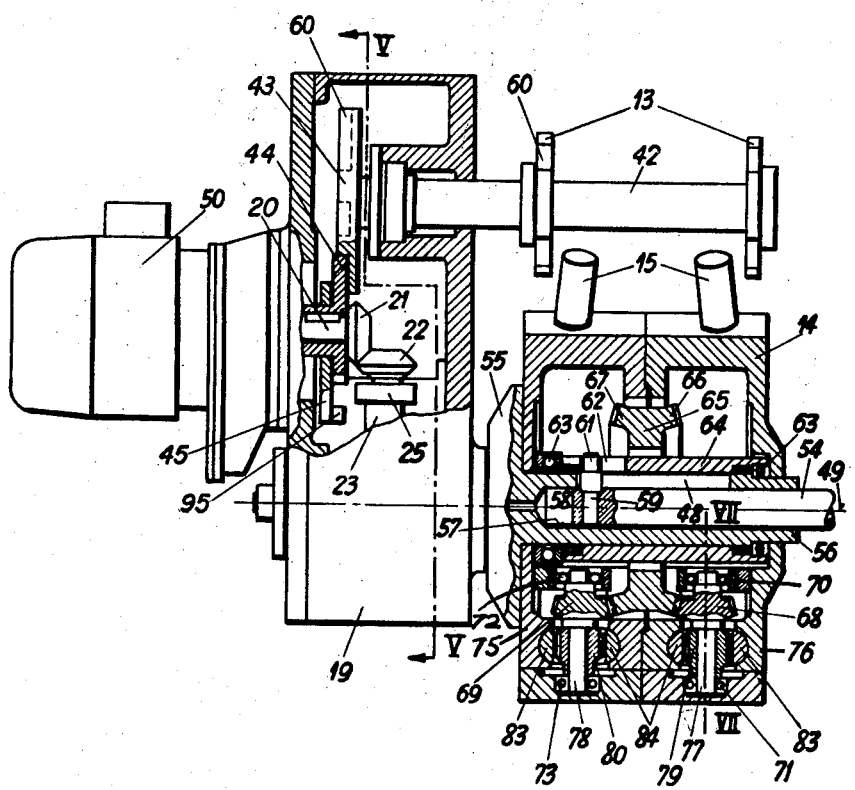
FIG. 4 is a partial section taken along the line IV—IV of FIG. 3.

Mounted on the transmission housing 19 is a stop transmission motor 50 (FIG. 1) with an output shaft 20 (FIGS. 4, 5 and 6). The output shaft 20 has keyed thereto a hub 44 with a roller lever 45 the roll 95 of which engages grooves 86 (FIG. 5) of a Geneva cross 43 in a manner known per se. The Geneva cross 43 is mounted on a distributing shaft 42 equipped with two distributing discs 13 (FIG. 4) and journalled in the housing 19. The said distributing discs 13 have four insert grooves 69 uniformly distributed over the circumference of said discs 13.

Figure 10:
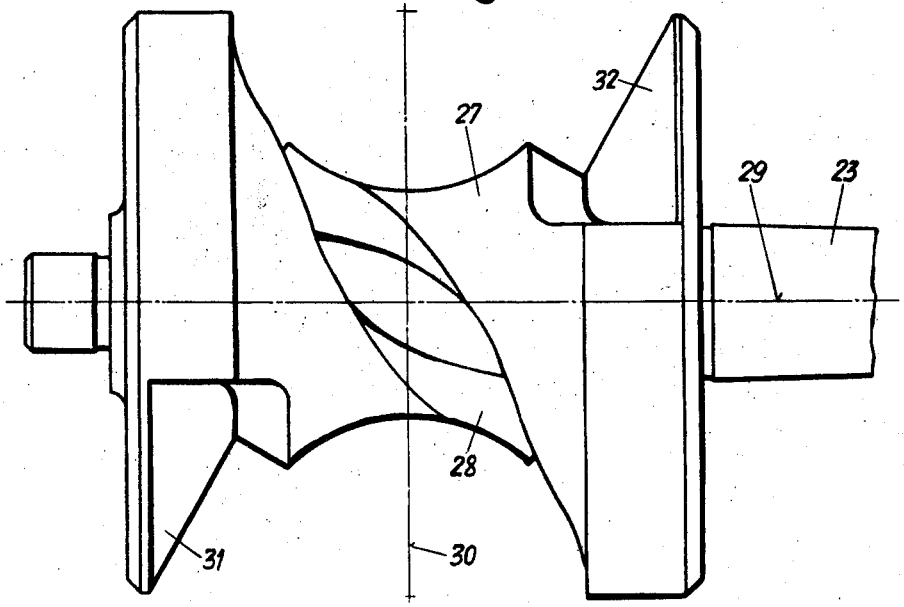
FIG. 10 is a partial view of the cam shaft.

Mounted on the output shaft 20 (FIGS. 4 and 5) is furthermore a bevel gear 21 meshing with a bevel gear 22 keyed to a shaft 23 which is journalled in bearings 25 and 26 in housing 19. The other end of shaft 23 is designed as cam shaft 27 (FIG. 10) and is provided with a spiral groove 28 and the two end portions 31 and 32. The spiral groove 28 is along the shaft axis 29 of varying pitch which is greatest within the range of the transverse plane of symmetry 30, and which is zero toward the end portions 31 and 32 of cam shaft 23. Perpendicularly to the shaft axis 29 (FIGS. 5 and 6) is provided a wheel 33 which is mounted on a shaft 37 journalled in bearings 38 and 39. This wheel 33 has three studs 34, 35 and 36 located in a plane perpendicular to the axis 49 of wheel 37 and uniformly distributed over the circumference of wheel 33. Wheel 33 is continuously operatively connected to cam shaft 27 in such a way that at least one of the studs 34, 35, 36 engages the spiral groove 28. According to FIG. 5, studs 35 and 34 engage spiral groove 28.

As will be evident from FIG. 4, a charging drum 14 including the housing portions 75, 76, is connected to a flange-shaped shaft portion 55 of the shaft 37. That end 56 of shaft 37 which is adjacent the charging drum 14 is designed as hollow shaft section and in its bore 57 carries a control piston 54 the free end 58 of which has connected thereto a control stud 59. Stud 59 is guided in a groove 48 in hollow shaft 56, said groove being parallel to the drum axis 49, whereas the free end of hollow shaft 56 which is provided with a ring 61 engages a spiral-shaped control groove 62 of a sleeve 64 which is rotatably journalled in bearing 63 on shaft end 56. Keyed to sleeve 64 is a two-tooth ring bevel gear 65. The gear rings 66 and 67 of bevel gear 65 mesh each with three bevel gears 68 and 69 uniformly distributed over the circumference and running in bearings 70 to 73. These bearings are connected to housing portions 75, 76 screwed onto the shaft section 55 by means not shown. The bevel gears 68, 69 are provided with studs 77 and 78, respectively, with gears 79 and 80 on said studs. Gears 79 and 80 mesh with the toothed ends 83, 84 of the pairs 15 to 17 of the gripper arms in the interior of the drum 14.

FIG. 2 illustrates a diagrammatic top view of the lathe and shows merely those parts which are necessary for the discussion of the present invention. Displaceably mounted on the lathe bed 1 is a tail stock 51 with a tail spindle 52. The movement of the tail spindle 52 is effected automatically by means not shown in the drawing, and the control thereof forms a part of the entire control program. Tail spindle 52 has its rear portion provided with a control arm 53 which latter, when tail spindle 52 moves out or returns, displaces control piston 54 of drum 14 along the drum axis 49, said control piston 54 being connected to control arm 53 in any convenient manner. A workpiece 40 to be machined, centered at both sides and having the desired length, is illustrated in dot-dash lines between the points of the head stock 7 and the tail spindle 52 of the tail stock 51 (FIG. 2).

FIG. 2a shows the means for displacing the tail spindle 52 in the tail stock 51 toward the head stock 7. In the tail spindle there is provided a piston 139 with a piston rod 137, the latter being threadedly connected to the rear end of tail spindle 52. By alternatingly subjecting one or the other side of piston 136 to pressure, the displacement movement will be brought about. On piston rod 137 on a neck journal 138 there is provided a fork 140 which is connected in any convenient manner to the control arm 53 so that when displacing the tail spindle 52, the control arm 53 will be automatically displaced. At the end of control arm 53 there is mounted a coupling member 151 engaged by a ball-shaped end 142 of the central control piston 54. Fixedly connected to fork 140 is a rail field 129 indicated in FIGS. 2a, 2b and 11.

As will be evident from FIGS. 1, 2 and 3, the lathe bed 1 or stand 2 has a diagrammatically illustrated longitudinal running surface 87 on which a carriage 89 with a vertically arranged pivot 85 is longitudinally displaceable. At the lower portion of the transmission housing 19 there is arranged a thrust bearing 88 for the pivot 85 on which the entire charging device is supported. At the upper portion of the lathe bed or above the head stock 7 (FIGS. 3, 9, 9a and 9b) there are arranged a hydraulic cylinder 96 extending in a direction parallel to the axis of rotation 6, and a sliding surface 104. Piston rod 97 longitudinally displaceable in cylinder 96 and equipped at the ends thereof with two pistons 98, is partially designed as gear rack 99 meshing with a gear 100. Gear 100 is mounted in a cylinder housing 81 on a pinion shaft 101 having keyed thereto a gear 102 meshing with a gear rack 103 of a carriage 105 which is displaceable on the upper sliding surface 104. On a self-aligning or swing bearing 106 on carriage 105 there is provided a discharging arm 107 which is connected to a carriage 89 arranged below the transmission housing 19.

The head stock 7 of the lathe has two supporting arms 90 carrying a cam plate 91 with a guiding groove 92. An arm 94 mounted on transmission housing 19 carries a roller 93 guided in the guiding groove 92 of plate 91. As will be evident from FIG. 2, guiding groove 92 extends in such a way that when piston rod 97 is longitudinally displaced, for instance toward the left, the gear 102, which always remains at the same spot, will displace toward the left rack 103 with carriage 105 and displacing arm 107. The lower carriage 89 is moved along by arm 107. By means of guiding cam 92, first the entire loading device is turned, which means housing 19 with magazine 12, distributing device 42, 13 and drum 14, about pivot stud 85 on carriage 89. Thereupon, the entire loading device is displaced in the turned position by a certain stroke toward the left (FIG. 2) into the position indicated by dot-dash lines.

This turning and return movement of the device is actuated only when within the working range of the lathe adjusting operations have to be effected, as for instance the adjustment of the chuck, of the tools, etc.

Referring now to FIG. 11, this figure shows a pulse switch 111 which at the end of the turning movement of the loading drum 14 permits actuation of a starter switch 114 for the feed of the tail spindle 52.

The arrangement of FIG. 11 also comprises a locking switch 113 for the loading drum 14. When the turning movement of drum 14 has been completed and motor 50 is turned off, switch 113 will actuate the blocking device for drum 14.

The arrangement furthermore comprises a switch 114 for initiating the feed movement of the tail spindle. More specifically, when the machined workpiece 71 has dropped into the chute 46 and the conveyor trough 47, the workpiece is by means of a diagrammatically indicated abutment 110 on piston rod 127 of a pneumatic cylinder 128 pulled toward the left (FIG. 11) and deposited. The abutment 110 then returns to its FIG. 11 position in which the switch 114 is actuated which will then initiate the movement of the tail spindle 52 toward the left. When the abutment with a machined workpiece ejected into the conveyor trough 47 has arrived at the left end of said trough, a control member 115 controls the pressure supply to cylinder 128 so that the piston rod 127 with abutment 110 will again move toward the right.

When the tail spindle by means of a pressure medium has been advanced toward the left by a certain distance determined by the length of the workpiece 40, a control member 130 (FIG. 2b) arranged on a rail field 129 of control arm 53 will actuate a switch member 116 on the tail stock 51 which will make it possible to continue the control program. If, for instance, by a faulty clamping of a workpiece 40, the tail spindle has not moved over the intended distance, the normally next following operation cannot be started.

If after a completed working cycle, the tail spindle 52 has been withdrawn, a control member 131 on rail field 129 will actuate a switch member 117 on the tail stock 51 whereby the next following rotary movement of the loading drum 14 will be made possible.

Shortly before the tail spindle 52 has reached its outermost left-hand working position, a control member 132 on rail field 129 actuates a switch member 118 on tail stock 51 which switch member 118 unlocks the loading drum 16 and thereby permits the latter to carry out the next following rotary movement.

When the magazine 12 is empty, a pulse emitter 119 turns off the automatic mechanism so that a further control will be impossible.

If the workpiece clamping device after completion of the machining operation has been unclamped, a switch member (not shown) connected to the piston rod 127 will release a control member 120 on conveyor trough 47 which control member initiates the return movement of the tail spindle 52.

If the said workpiece clamping device has been clamped for carrying out a turning operation, a control member (not shown) on piston rod 127 actuates a switch 121 on conveyor trough 47 which switch initiates the displacement movement of carriage 3. A rail field 133 arranged on carriage 3 carries a control member 134 which actuates a switch member 122 on the lathe 1. This switch member 122 in its turn initiates a displacement movement of the piston rod 127 with abutment 110 in the conveyor trough 47 whereby a finish completed workpiece will be ejected toward the left.

On the rail field 133 of carriage 3 there is arranged a control member 135 which, during the longitudinal displacement of the carriage 3 on lathe 1, will actuate a switch 123 which in its turn initiates the feeding movement of a tool carriage 5 shown in FIG. 3.

The arrangement of FIG. 11 furthermore comprises a pressure check control which checks the feeding movement of tail spindle 52 toward the workpiece and which in response to occurring irregularities as for instance incomplete displacement of tail spindle 52, i.e. improper clamping of the workpiece, will interrupt the automatic cycle and thus will bring about an emergency stop.

Finally the arrangement of FIG. 11 also completes a control member 125 on the loading device which is actuated by an abutment 136 on a hydraulic cylinder 96 when the loading device is in its position of operation. In this way, the automatic control will be prevented from accidental actuation when the loading device is not in its position of operation.

*Operation*

The workpiece loading and discharging device as described above operates in the following manner. Workpieces to be machined as for instance axle parts 40, 40a, 40b, 40c, 40d are by means of a feeding device as for instance a chute (not illustrated) loaded into the magazine 12. The lowermost workpiece 40 rests on the cylindrical portion of the distributing device 13, 42. This position corresponds to the rest position. After the lathe has been adjusted according to the desired program and has been properly set, the main motor and also the feeding auxiliary motors are switched on. When starting the stop-drive motor 50 by means (not illustrated) which are actuated by the control program, the motor 50 performs only so many revolutions that the output shaft 20 carries out a single complete revolution and then stops. The output shaft 20 with the roller lever 45 and pinion 21 starts to rotate uniformly and thereby through the intervention of the bevel gear 22 imparts upon shaft 23 with cam shaft 27 a uniform rotary movement. The cam shaft 27 carries out the function of a worm with variable pitch. Stud 34 of stud wheel 33 has, in conformity with FIG. 5, just moved into the spiral groove 28 of the main shaft 27, whereas stud 35 occupies a position directly prior to leaving groove 28. In conformity with the low pitch of groove 28 at the looped ends 31 and 32, the stud wheel 33 is in a manner analogous to a worm wheel first rotated only slowly. Toward the central portion of said groove, however, the pitch 28 increases considerably so that the stud wheel 33 will greatly accelerate. After stud 34 has passed through the plane of symmetry 30, a corresponding retardation of the wheel 33 will be effected. This angular velocity, which steadily increases from zero to a maximum value and then decreases to zero, is determined by the corresponding predetermined design of groove 28. The charging drum 14 connected to shaft 37, 55, 56 therefore will, during a complete revolution of the output shaft 20, carry out a rotary movement of 120° whereby it is turned into a rest position, and shocks and strong wear will be avoided. During the rotation of the output shaft 20 by 360°, the distributing shaft 42 with disc 13 carries out a rotary movement by 90° which in the example illustrated in FIG. 5 is effected by a Geneva cross drive 43, 44, 45, 95, 86 known per se. During this operation, one of the four inserting grooves 60 of disc 13 has moved below the workpiece 40 to be machined. Consequently, the respective workpiece drops into this groove 60 and during the subsequent rotative movement of the distributing shaft 42 is carried away by the latter. A cover sheet 41 (FIG. 3) prevents the workpiece from dropping out of groove 60 until it drops into the pair of gripper arms 15 and 16 of the loading drum 14 which are in their catching position. It is, of course, to be understood that the drum 14 due to the proper adjustment of the drives of the distributing device 42, 13 and of the loading or charging drum 14, will occupy its respective position for receiving the workpiece 40 just at said time. The pairs of arms 15 and 16 grasp the workpiece 40 and hold the same. Workpiece 40 will now in pairs of arms 15 and 16 of loading drum 14 be rotated in the direction of the arrow 82 by 120° about the axis, i.e. in clockwise direction (FIG. 3) whereby the workpiece 40 will be located along the axis 6 of rotation of the lathe.

As soon as workpiece 40, as shown in FIG. 3, will occupy its proper position with regard to the head stock 7 and tail stock 51, i.e. will be coaxial with the axis of rotation 6 and the axis of the spindle of the tail stock 7, the tail spindle 52 and with the latter the control arm 53 will move toward the head stock 7 in conformity with the program. Control piston 54 likewise moves in this direction (FIG. 4). The control stud 59 connected to piston end 58 moves toward drum housing 14 into the position shown in FIG. 4 and due to the control groove 62 rotates sleeve 64 and with the latter the bevel gear 65. This rotation likewise affects all bevel gears 68 and 69 and pinions 79 and 80. These pinions rotate so that the toothed portions 83 and 84 of the gripper pairs 15, 16, 17 move in the direction toward the drum housing 14 which means pull back. The grasping portions of the gripper arm pairs 15 to 17 will then open. Workpiece 40 will, by the tip of the advancing tail spindle, be pushed against the spindle tip of the tail stock 7 and by means of a non-illustrated device will be held and will be driven during the successive machining operation, whereas the gripper arms 15 to 17 will be moved into their innermost position in the drum housing 14.

Simultaneously with the release of the workpiece 40 for the chucking and machining, also the parts of the gripper arms 16 and 17 (FIG. 3) will open. As a result thereof, the said pairs of gripper arms release the finished workpiece 74 (FIG. 1) which will then through a chute 46 drop into a conveyor trough 47.

Figure 7:
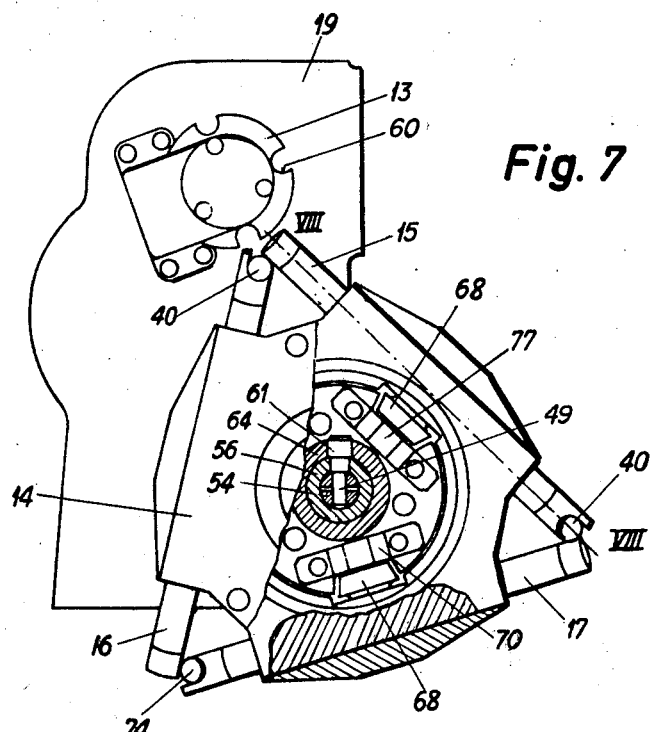
FIG. 7 is a partial section taken along the line VII—VII of FIG. 4 with pairs of gripper arms illustrated in closed position.
Figure 8:
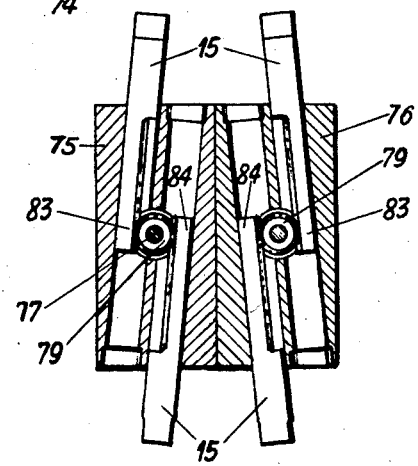
FIG. 8 is a section along the line VIII—VIII of FIG. 7.
Figure 9:
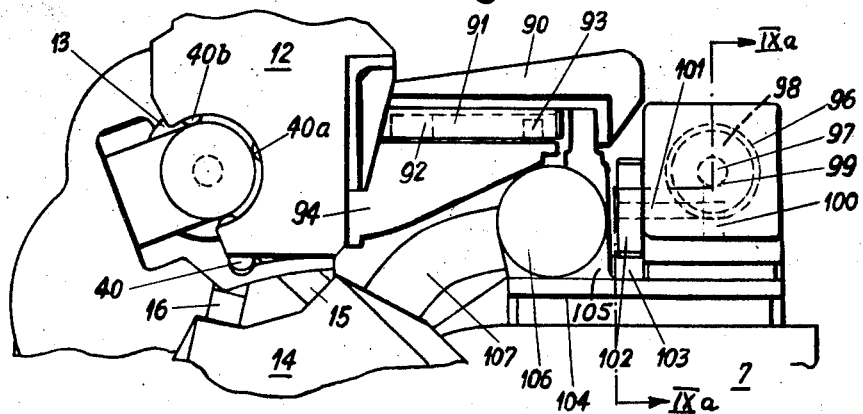
FIG. 9 is a partial view of the displacing means for the charging apparatus.

While in conformity with FIG. 7 the gripper arm parts of the gripper pairs 15 and 17 release workpiece 40 in the axis of rotation 6 for machining and the gripper parts of pairs 16 and 17 release the machined work piece 74 into chute 46, the next workpiece 40a to be machined will, from groove 60, move into the opened upwardly directed parts of the pairs of gripper arms 15 and 16.

As soon as workpiece 40 has been finished, the tail spindle 52 moves away from the head stock 7. During this movement, the tail spindle takes with it the control piston 54, and control stud 59 due to its mesh with control groove 62 turns sleeve 64. The bevel gear 65 will be turned back and with the latter in an analogous manner as described, also the bevel gears 68, 69, pinions 79, 80 and parts 83, 84 of the gripper arm pairs 15, 16, 17. These gripper arm pairs then assume their closed position in conformity with FIGS. 3 and 7 in which they hold on one hand the workpiece 48 to be machined further from groove 60, and on the other hand the machined workpiece 40. Thereupon, loading drum 14 rotates in the above mentioned manner by 120° while the distributing shaft 42 rotates by 90°. Subsequently, the cycle starts by again opening the gripper arm pairs 15, 16, 17.

The loading device described above is more wear-resistant than heretofore known loading devices because it imparts the rotating movements upon loading drum and feeding rollers always under mutual engagement and considerably softer.

By appropriate selection of the groove design, the loading device according to the invention makes it possible to effect the movement of the loading drum in any desired manner and in conformity with the respective prevailing circumstances.

The elements employed according to the present invention for controlling the loading drum 14 has over heretofore known control members as for instance a Geneva cross the advantage that the accelerations and retardations will be effected in a steady manner. This means neither shocks are encountered in the transmission nor wear inherent thereto. This is in particular the case with relatively heavy machine parts as, for instance, the employed and floatingly journalled loading drum 14 with the workpieces 40 to be conveyed.

In the example illustrated, the control piston 54 is actuated directly from the head stock trail spindle 52 through a control arm 53. The actuation could, however, also be effected by other means in an indirect manner as for instance by the control valves controlled by the tail spindle, and a further pneumatic operable piston.

By appropriately designing the magazine 12, the distributing device, and the ends of the workpiece gripper arm pairs 15, 16, and 17, workpieces of other diameters and shapes can be handled by the device described above.

Instead of the illustrated and described longitudinal displacement of the loading device by hydraulic means, it is, of course, to be understood that also a mechanical, electrical or electromechanical combination may be employed.

It is, of course, to be understood that the present invention is, by no means, limited to the particular construction shown in the drawings but also comprises any modifications within the scope of the appended claims.

What we claim is:

1. In combination with a machine tool, especially lathe, a workpiece loading and discharging apparatus, which comprises: a magazine for receiving and releasing workpieces to be machined, distributing means arranged adjacent said magazine and operable to withdraw one workpiece at a time from said magazine, loading means arranged adjacent said distributing means and including a plurality of pairs of gripper means movable from a workpiece releasing position into a workpiece grasping position and vice versa, control means located centrally with regard to said pairs of gripper means for simultaneously actuating all of said pairs of said gripper means, said pairs of gripper means be operable successively to receive a workpiece from said distributing means and subsequently to move said workpiece into the axis of rotation of a rotary element of said machine tool about which axis the workpiece is to be machined and following the machining of the workpiece to move the latter into a discharging station, and control gear means operable at a substantially constant speed and operatively connected to both said distributing means and said loading means for moving the same from one working station to the next working station, said control gear means including a grooved body with helical groove means having a pitch increasing toward the central portion thereof and being rotatably connected to said control gear means for operation at a constant speed and also including feeler means engaging said groove means and operatively connected to said loading means.

2. In combination with a machine tool, especially lathe, a workpiece loading and discharging apparatus, which comprises: a magazine for receiving and releasing workpieces to be machined, distributing means arranged adjacent said magazine and operable to withdraw one workpiece at a time from said magazine, loading means arranged adjacent said distributing means and including a plurality of pairs of gripper means movable from a workpiece releasing position into a workpiece grasping position and vice versa, control means located centrally with regard to said pairs of gripper means for simultaneously actuating all of said pairs of said gripper means, said pairs of gripper means being operable successively to receive a workpiece from said distributing means and subsequently to move said workpiece into the axis of rotation of a rotary element of said machine tool about which axis the workpiece is to be machined and following the machining of the workpiece to move the latter into a discharging station, and control gear means operable at a substantially constant speed and operatively connected to both said distributing means and said loading means for moving the same from one working station to the next working station, said control gear means including a grooved body with helical groove means having a pitch increasing toward the central portion thereof and being rotatably connected to said control gear means for operation at a constant speed, said control gear means also including wheel means provided with a plurality of feeler members uniformly distributed over said wheel means for engaging said groove means, said grooved body and said wheel means being so designed that during a complete revolution of said grooved body at least one of said feeler means engages said groove means.

3. In combination with a machine tool, especially lathe, a workpiece loading and discharging apparatus, which comprises: a magazine for receiving and releasing workpieces to be machined, distributing means arranged adjacent said magazine and operable to withdraw one workpiece at a time from said magazine, loading means arranged adjacent said distributing means and including a plurality of pairs of gripper means movable from a workpiece releasing position into a workpiece grasping position and vice versa, control means located centrally with regard to said pairs of gripper means for simultaneously actuating all of said pairs of gripper means, said pairs of gripper means being operable successively to receive a workpiece from said distributing means and subsequently to move said workpiece into the axis of rotation of a rotary element of said machine tool about which axis the workpiece is to be machined and following the machining of the workpiece to move the latter into a discharging station, and control gear means operable at a substantially constant speed and operatively connected to both said distributing means and said loading means for moving the same from one working station to the next working station, said control gear means including a grooved body with helical groove means having a pitch increasing toward the central portion thereof and being rotatably connected to said control gear means for operation at a constant speed and also including feeler means engaging said groove means and operatively connected to said loading means, said groove means being symmetrical with regard to a transverse plane through said grooved body.

4. An apparatus according to claim 3, in which said groove means has its greatest pitch within the range of said plane of symmetry.

5. In combination with a machine tool, especially lathe, a workpiece loading and discharging apparatus, which comprises: a magazine for receiving and releasing workpieces to be machined, distributing means arranged adjacent said magazine and operable to withdraw one workpiece at a time from said magazine, loading means arranged adjacent said distributing means and including a plurality of pairs of gripper means movable from a workpiece releasing position into a workpiece grasping position and vice versa, control means located centrally wtih regard to said pairs of gripper means for simultaneously actuating all of said pairs of said gripper means, said pairs of gripper means being operable successively to receive a workpiece from said distributing means and subsequently to move said workpiece into the axis of rotation of a rotary element of said machine tool about which axis the workpiece is to be machined and following the machining of the workpiece to move the latter into a discharging station, and control gear means operable at a substantially constant speed and operatively connected to both said distributing means and said loading means for moving the same from one working station to the next working station, and vertical pivot means having said loading and discharging apparatus pivotally mounted thereon for selectively turning said loading and discharging apparatus from an operative position into an inoperative position and vice versa.

6. In combination with a machine tool, especially lathe, a workpiece loading and discharging apparatus, which comprises: a magazine for receiving and releasing workpieces to be machined, distributing means arranged adjacent said magazine and operable to withdraw one workpiece at a time from said magazine, loading means arranged adjacent said distributing means and including a plurality of pairs of gripper means movable from a workpiece releasing position into a workpiece grasping position and vice versa, control means located centrally with regard to said pairs of gripper means for simultaneously actuating all of said pairs of said gripper means, said pairs of gripper means being operable successively to receive a workpiece from said distributing means and subsequently to move said workpiece into the axis of rotation of a rotary element of said machine tool about which axis the workpiece is to be machined and following the machining of the workpiece to move the latter into a discharging station, and control gear means operable at a substantially constant speed and operatively connected to both said distributing means and said loading means for moving the same from one working station to the next working station, and carriage means supporting said loading and discharging apparatus for selectively moving the same in a direction parallel to the axis of rotation of a rotary member of said machine tool.

7. In combination with a machine tool, especially lathe, a workpiece loading and discharging apparatus which comprises: a magazine for receiving and releasing workpieces to be machined, distributing means arranged adjacent said magazine and operable to withdraw one workpiece at a time from said magazine, loading drum means arranged adjacent said distributing means and including a plurality of pairs of gripper arms movable from a workpiece releasing position into a workpiece holding position and vice versa, control piston means located centrally within said loading drum means for simultaneously actuating all of said pairs of gripper arms, said pairs of gripper arms being operable successively to receive a workpiece from said distributing means and subsequently to move the same into the axis of rotation of a rotary element of said machine tool about which the workpiece is to be machined, said pairs of gripper arms also being operable following the machining of the workpiece to move the latter into a discharging station, control gear means operable at a substantially constant speed and operatively connected to both said distributing means and said loading drum means for actuating the same, actuating means arranged outside said central control piston means and operatively connected thereto for actuating the same, and means including an element of said machine tool moveable to effect clamping of a workpiece on said axis connected to said actuating means to effect operation thereof.

8. An arrangement according to claim 7, in which said element of said machine tool includes a tail spindle, and in which said last mentioned means includes a control member operatively connected to said tail spindle.

References Cited by the Examiner
UNITED STATES PATENTS

| | | | |
|---|---|---|---|
| 1,164,272 | 12/15 | Farnum | 82—2.7 X |
| 2,782,689 | 2/57 | Carlsen et al. | 10—166 X |

WILLIAM W. DYER, Jr., *Primary Examiner.*